US008345530B2

(12) United States Patent
Ito

(10) Patent No.: US 8,345,530 B2
(45) Date of Patent: Jan. 1, 2013

(54) OBJECTIVE LENS AND OPTICAL PICKUP APPARATUS USING THE SAME

(75) Inventor: Mitsuru Ito, Zama (JP)

(73) Assignees: SANYO Electric Co., Ltd., Moriguchi-shi (JP); SANYO Optec Design Co., Ltd., Tokyo (JP)

( * ) Notice: Subject to any disclaimer, the term of this patent is extended or adjusted under 35 U.S.C. 154(b) by 0 days.

(21) Appl. No.: 13/308,055

(22) Filed: Nov. 30, 2011

(65) Prior Publication Data

US 2012/0134255 A1 May 31, 2012

(30) Foreign Application Priority Data

Nov. 30, 2010 (JP) ................................. 2010-265932

(51) Int. Cl.
*G11B 7/00* (2006.01)

(52) U.S. Cl. ................................... 369/112.26; 369/121

(58) Field of Classification Search ........................ None
See application file for complete search history.

(56) References Cited

U.S. PATENT DOCUMENTS 7,672,212 B2 * 3/2010 Nakamura et al. ....... 369/112.12
2004/0047269 A1 * 3/2004 Ikenaka et al. ........... 369/112.08

FOREIGN PATENT DOCUMENTS

JP 4531649 11/2006
JP 2010-20899 1/2010

* cited by examiner

*Primary Examiner* — Paul Huber
(74) *Attorney, Agent, or Firm* — Morrison & Foerster LLP

(57) ABSTRACT

Disclosed is an objective lens that favorably focuses multiple laser beams having different wavelengths on information recording layers of optical discs, and an optical pickup apparatus including the lens. The objective lens of the invention is provided with a first region for focusing laser beams of the BD, DVD and CD standards. The first region is provided with an annular zone step having a height calculated on the basis of a wavelength of the laser beam of the BD standard, and thus causes chromatic aberration of the laser beam of the DVD standard. This chromatic aberration corrects spherical aberration occurring due to a difference in thickness between coating layers of optical discs. In the invention, the curve surface shape of the first region is adjusted so that the BD and DVD standards can share the aberration for reducing the aberration of the laser beam of the DVD standard.

13 Claims, 9 Drawing Sheets

20

52
10
42
40
44
56 54 28 34 36
38 23
26 32
30
22 24
+Y
Z
−X +X
−Y

| REGION | F1 | F2 | F3 | F4 | F5 | F6 |
|---|---|---|---|---|---|---|
| CORRRESPONDING LASER BEAM | BD/DVD/CD | DVD/CD | BD/DVD | BD | DVD | BD |
| R (mm) | 0.000 ~0.5928 | 0.5928 ~0.932 | 0.932 ~1.013 | 1.013 ~1.08 | 1.08 ~1.200 | 1.200 ~1.510 |
| ANNULAR ZONE SHAPE | | | | — | — | — |
| NUMBER OF ANNULAR ZONES | 2 | 11 | 3 | 0 | 0 | 0 |

| REGION | BOUNDARY BETWEEN F1 AND F2 |
|---|---|
| ANNULAR ZONE SHAPE | |

| REGION | BOUNDARY BETWEEN F2 AND F3 |
|---|---|
| ANNULAR ZONE SHAPE | |

FIG.6A

| SURFACE | CURVATURE RADIUS R(mm) | SURFACE INTERVAL d(mm) | REFLACTIVE INDEX n |
|---|---|---|---|
| (OBJECT DISTANCE) | – | ∞ | – |
| (STOP) | ∞ | 0 | – |
| 1(OPTICAL PICKUP LENS: SURFACE R1) | R1 | 1.57 | n1 |
| 2(OPTICAL PICKUP LENS: SURFACE R2) | R2 | d2 | – |
| 3(OPTICAL TRANSPARENT LAYER IN OPTICAL DISC) | ∞ | d3 | n2 |
| 4(OPTICAL TRANSPARENT LAYER IN OPTICAL DISC) | ∞ | 0 | – |

FIG.6B

| USED λ (nm) | OPENING SIZE Φ (mm) | REFRACTIVE INDEX OF LENS n1 | REFRACTIVE INDEX OF OPTICAL TRANSPARENT LAYER IN OPTICAL DISC n2 | SURFACE INTERVAL d2 (mm) | SURFACE INTERVAL d3 (mm) |
|---|---|---|---|---|---|
| 405 | 3.02 | 1.558701 | 1.620808 | 0.982361216 | 0.0875 |
| 660 | 2.40 | 1.539642 | 1.578609 | 0.721964692 | 0.6 |
| 785 | 1.83 | 1.536256 | 1.567308 | 0.347388732 | 1.2 |

FIG.6C

TEMPERATURE CHARACTERISTICS OF MATERIAL : $\Delta n/\Delta T(1/^{\circ}C)$

| WAVELENGTH | 405 | 660 | 785 |
|---|---|---|---|
| LENS MATERIAL | −1.2E−04 | −1.2E−04 | −1.2E−04 |
| OPTICAL TRANSPARENT LAYER IN DISC | −1.0E−04 | −1.0E−04 | −1.0E−04 |

FIG.6D

TEMPERATURE CHARACTERISTICS OF MATERIAL : $\Delta n/\Delta \lambda(1/nm)$

| WAVELENGTH | 405 | 660 | 785 |
|---|---|---|---|
| LENS MATERIAL | −1.4E−04 | −3.2E−05 | −2.9E−05 |
| OPTICAL TRANSPARENT LAYER IN DISC | −4.1E−04 | −6.9E−05 | −3.9E−05 |

FIG.6E

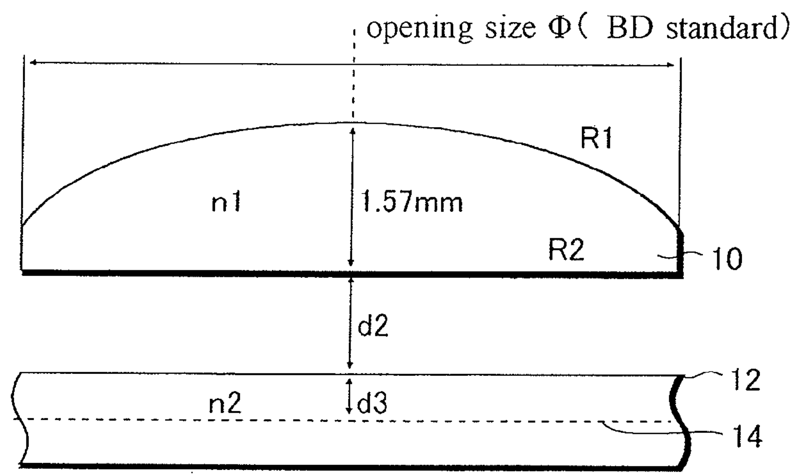

FIG.7A

OPTICAL PICKUP LENS SURFACE R1

| REGION | F1 | | F2 | | | | |
|---|---|---|---|---|---|---|---|
| ANNULAR ZONE x | 1 | 2 | 3 | 4 | 5 | 6 | 7 |
| USED WAVELENGTH(nm) | 405/660/785 | 405/660/785 | 660/785 | 660/785 | 660/785 | 660/785 | 660/785 |
| DEGREE m OF ANNULAR ZONE STEP OF ANNULAR ZONE x WITH RESPECT TO LENS CENTER / WAVELENGTH (nm) OF DEGREE m | 0/405.660.785 | 8/405 | -2/660 | -3/660 | -4/660 | -5/660 | -6/660 |
| ANNULAR ZONE START RADIUS(mm) | 0 | 0.3456 | 0.5928 | 0.638605 | 0.69564 | 0.739585 | 0.775115 |
| ANNULAR ZONE END RADIUS(mm) | 0.3456 | 0.5928 | 0.638605 | 0.69564 | 0.739585 | 0.775115 | 0.80597 |
| A10 | 0 | 0.005892583 | -0.002565905 | -0.003909491 | -0.005253112 | -0.006597174 | -0.007939545 |
| R1 | 1.22278623040 | 1.22066465970 | 1.22960685940 | 1.23007820560 | 1.23054920460 | 1.23102110690 | 1.23149187040 |
| K1 | -1.26226388780 | -1.26248314370 | -1.17702171450 | -1.17715130120 | -1.17899821460 | -1.17693876940 | -1.17871364090 |
| A14 | 0.05601351500 | 0.05630392250 | 0.05369275200 | 0.05364171250 | 0.05370311470 | 0.05350884290 | 0.05356690290 |
| A16 | 0.00329636150 | 0.00332191470 | 0.00540750420 | 0.00539378710 | 0.00539102590 | 0.00536143890 | 0.00534711020 |
| A18 | 0.00085487400 | 0.00083846400 | 0.00101859830 | 0.00103128740 | 0.00094197680 | 0.00110671170 | 0.00106591100 |
| A110 | 0.00280846770 | 0.00290642560 | 0.00070976790 | 0.00067913650 | 0.00088748950 | 0.00047003680 | 0.00057346180 |
| A112 | -0.01089349810 | -0.01116287090 | -0.00029117610 | -0.00025884520 | -0.00053476620 | 0.00003623200 | -0.00011364650 |
| A114 | 0.02008792420 | 0.02047528140 | 0.00044668180 | 0.00042700750 | 0.00061552390 | 0.00020562520 | 0.00031517750 |
| A116 | -0.01428082040 | -0.01450568980 | -0.00005890700 | -0.00005473490 | -0.00010796940 | 0.00001099070 | -0.00002213310 |

| REGION | F2 | | | | | |
|---|---|---|---|---|---|---|
| ANNULAR ZONE x | 8 | 9 | 10 | 11 | 12 | 13 |
| USED WAVELENGTH(nm) | 660/785 | 660/785 | 660/785 | 660/785 | 660/785 | 660/785 |
| DEGREE m OF ANNULAR ZONE STEP OF ANNULAR ZONE x WITH RESPECT TO LENS CENTER / WAVELENGTH (nm) OF DEGREE m | -7/660 | -8/660 | -9/660 | -10/660 | -11/660 | -12/660 |
| ANNULAR ZONE START RADIUS(mm) | 0.80597 | 0.83215 | 0.85646 | 0.877965 | 0.8976 | 0.915365 |
| ANNULAR ZONE END RADIUS(mm) | 0.83215 | 0.85646 | 0.877965 | 0.8976 | 0.915365 | 0.932 |
| A10 | -0.009284241 | -0.010625333 | -0.011971505 | -0.013315451 | -0.014659485 | -0.01600142 |
| R1 | 1.23196322880 | 1.23243350210 | 1.23290571470 | 1.23337792170 | 1.23384806400 | 1.23432001690 |
| K1 | -1.17819735170 | -1.18008002920 | -1.18045774040 | -1.18108286700 | -1.18177569280 | -1.18077450370 |
| A14 | 0.05346967400 | 0.05353458380 | 0.05349973560 | 0.05348875740 | 0.05347238080 | 0.05334845240 |
| A16 | 0.00536752700 | 0.00535338190 | 0.00534291630 | 0.00525953540 | 0.00527168060 | 0.00524783800 |
| A18 | 0.00094873700 | 0.00090757250 | 0.00089610150 | 0.00121916440 | 0.00105345200 | 0.00120091300 |
| A110 | 0.00085752120 | 0.00085325070 | 0.00098539290 | 0.00016802600 | 0.00048479290 | 0.00020103280 |
| A112 | -0.00050707510 | -0.00063580610 | -0.00069225050 | 0.00044328540 | -0.00000579830 | 0.00039367760 |
| A114 | 0.00059656470 | 0.00068434030 | 0.00072978910 | -0.00009379770 | 0.00023407230 | -0.00006048470 |
| A116 | -0.00010465540 | -0.00012972390 | -0.00014487040 | 0.00009693110 | -0.00000079881 | 0.00008650800 |

| REGION | F3 | | | F4 | F5 | F6 |
|---|---|---|---|---|---|---|
| ANNULAR ZONE x | 14 | 15 | 16 | 17 | 18 | 19 |
| USED WAVELENGTH(nm) | 405/660 | 405/660 | 405/660 | 405 | 660 | 405 |
| DEGREE m OF ANNULAR ZONE STEP OF ANNULAR ZONE x WITH RESPECT TO LENS CENTER / WAVELENGTH (nm) OF DEGREE m | -12/405 | -15/405 | -18/405 | 0/405 | 0/660 | 0/405 |
| ANNULAR ZONE START RADIUS(mm) | 0.932 | 0.9713 | 0.9933 | 1.013 | 1.08 | 1.2 |
| ANNULAR ZONE END RADIUS(mm) | 0.9713 | 0.9933 | 1.013 | 1.08 | 1.2 | 1.51 |
| A10 | -0.009020436 | -0.011273651 | -0.013526841 | 0 | 0 | 0 |
| R1 | 1.22603215760 | 1.22684299460 | 1.22765375390 | 1.22050948610 | 1.22829328160 | 1.22050948610 |
| K1 | -1.24745904930 | -1.25578446150 | -1.26483171650 | -1.26485530930 | -1.19011291850 | -1.26485530930 |
| A14 | 0.05457803060 | 0.05503827970 | 0.05554492180 | 0.05550264920 | 0.05304662330 | 0.05550264920 |
| A16 | 0.00346615350 | 0.00335963240 | 0.00324469910 | 0.00262143720 | 0.00489687200 | 0.00262143720 |
| A18 | 0.00100196150 | 0.00102270420 | 0.00103771460 | 0.00203740700 | 0.00054724710 | 0.00203740700 |
| A110 | 0.00030251240 | 0.00028464710 | 0.00027978860 | -0.00134841200 | 0.00098409480 | -0.00134841200 |
| A112 | -0.00061323420 | -0.00059596010 | -0.00059120770 | 0.00066038320 | -0.00067335870 | 0.00066038320 |
| A114 | 0.00076503030 | 0.00075215920 | 0.00074549340 | 0.00028259160 | 0.00066236490 | 0.00028259160 |
| A116 | -0.00015462280 | -0.00015172570 | -0.00015007560 | -0.00008838420 | -0.00011130510 | -0.00008838420 |

FIG.7B

OPTICAL PICKUP LENS SURFACE R2

| R2 | -4.840469022 |
|---|---|
| K2 | 4.092271022 |
| $A_24$ | 0.14639724 |
| $A_26$ | -0.211218588 |
| $A_28$ | 0.275635144 |
| $A_210$ | -0.225145786 |
| $A_212$ | 0.109364781 |
| $A_214$ | -0.029228184 |
| $A_216$ | 0.003320628 |

| R2 | -4.840469022 |
|---|---|
| K2 | 4.092271022 |
| $A_24$ | 0.14639724 |
| $A_26$ | -0.211218588 |
| $A_28$ | 0.275635144 |
| $A_210$ | -0.225145786 |
| $A_212$ | 0.109364781 |
| $A_214$ | -0.029228184 |
| $A_216$ | 0.003320628 |

OBJECTIVE LENS AND OPTICAL PICKUP APPARATUS USING THE SAME

This application claims priority from Japanese Patent Application Number JP 2010-265932 filed on Nov. 30, 2010, the content of which is incorporated herein by reference in its entirety.

BACKGROUND OF THE INVENTION

1. Field of the Invention

The present invention relates to an objective lens configured to focus multiple laser beams having different wavelengths on corresponding optical discs and also to an optical pickup apparatus including the objective lens.

2. Description of the Related Art

There are multiple standards for optical discs used as information recording media. The laser beam, the recording density, and the thickness of a coating layer for coating an information recording layer, which are used by the standards, are different among the standards. To put it specifically, the optical discs of the compact disc (CD) standard, the digital versatile disc (DVD) standard and the blue-ray disc (BD) standard are currently used.

In order to reduce the number of components, a single objective lens preferably supports the optical discs of these three standards. However, the occurrence conditions of spherical aberration, comatic aberration, chromatic aberration and the like on the discs are different among the standards. Thus, it is not easy to develop an objective lens with these conditions taken into consideration.

To address this issue, there have been made approaches shown in Japanese Patent No. 4531649 and Japanese Patent Application Publication No. 2010-20899, for example.

Japanese Patent No. 4531649 discloses an optical pickup apparatus supporting the optical discs of the BD, DVD and HD DVD standards by using the refraction effect of an objective lens. To put it specifically, referring to paragraphs [0046] to [0048] in this publication, the lens is designed to have a shape causing only small RMS wavefront aberrations in the HD DVD standard and the DVD standard. In addition, as described in paragraph [0049], the RMS wavefront aberration in the CD standard is reduced through adjustment of the degree of divergence of incident light.

Japanese Patent Application Publication No. 2010-20899 discloses that the spherical aberration occurring due to a difference in thickness between coating layers of optical discs is offset by the chromatic aberration occurring due to a difference in wavelength between laser beams, which thus improves the aberration as the entire objective lens. To put it specifically, referring to paragraphs [0027] to [0032] in this publication, the value of wavefront aberration of the laser beam of the CD standard and the value of wavefront aberration of the laser beam of the DVD standard are each set to a predetermined value by forming the lens surface into a predetermined shape.

SUMMARY OF THE INVENTION

However, in the case of the invention described in Japanese Patent No. 4531649, a finite laser beam is used for the CD standard, so that an optical device for making the laser beam of the CD standard finite is required. Thus, there may be an increase in costs because the number of optical devices for forming the optical pickup apparatus increases.

Moreover, the invention described in Japanese Patent Application Publication No. 2010-20899 relates to an objective lens configured to focus the laser beams of the two standards, which are the DVD standard and the CD standard. Accordingly, it is very difficult to apply, without any change, the invention described in this publication to an optical disc of the BD standard, which has an extremely thin coating layer for coating an information recording layer.

Furthermore, there is proposed a technique to provide an objective lens configured to produce diffraction effect and thereby having compatibility with laser beams of multiple wavelengths. However, the intensity of the laser beam focused by the objective lens using the diffraction effect is low, which in turn may lower reading accuracy.

The present invention has been made with the aforementioned problems taken into consideration. An object of the invention is to provide an objective lens configured to focus multiple laser beams having different wavelengths on information recording layers of optical discs in a good condition, and also to provide an optical pickup apparatus including the objective lens.

A preferred embodiment of the invention is an objective lens configured to focus a first laser beam having a first wavelength on an information recording layer of a first optical disc, to focus a second laser beam having a second wavelength longer than the first wavelength on an information recording layer of a second optical disc having a coating layer thicker than that of the first optical disc, and to focus a third laser beam having a wavelength longer than the first and second wavelengths on an information recording layer of a third optical disc having a coating layer thicker than those of the first and second optical discs, the objective lens including a center region provided at and around a center portion of the objective lens, and configured to focus the first laser beam, the second laser beam and the third laser beam respectively on the information recording layers of the first optical disc, the second optical disc and the third optical disc. The center region is set to have a surface shape including an annular zone step having a step amount calculated on the basis of the wavelength of the first laser beam, the surface shape causing aberrations of both of the first laser beam and the second laser beam.

An optical pickup apparatus of a preferred embodiment of the invention includes the objective lens with such a configuration.

BRIEF DESCRIPTION OF THE DRAWINGS

FIG. 1 are diagrams of an objective lens of a preferred embodiment.

FIG. 2 are diagrams showing how the objective lens of the preferred embodiment focuses a laser beam.

FIG. 3 are graphs showing aberration of the BD standard when the objective lens of the preferred embodiment is used.

FIG. 4 are graphs showing aberration of the DVD standard when the objective lens of the preferred embodiment is used.

FIG. 5 are graphs showing aberration of the CD standard when the objective lens of the preferred embodiment is used.

FIGS. 6A to 6D are tables showing parameters used in determining the characteristics and shape of the objective lens of the preferred embodiment, and FIG. 6E is a diagram for describing the parameters shown in FIG. 6A and the like.

FIG. 7 are tables showing parameters used in determining the shape of the objective lens of the preferred embodiment. FIG. 7A shows parameters defining the shape of a lens surface on which an annular zone is provided. FIG. 7B shows parameters defining a lens surface on which no annular zone is formed.

DESCRIPTION OF THE INVENTION

Figures 1A, 1B:
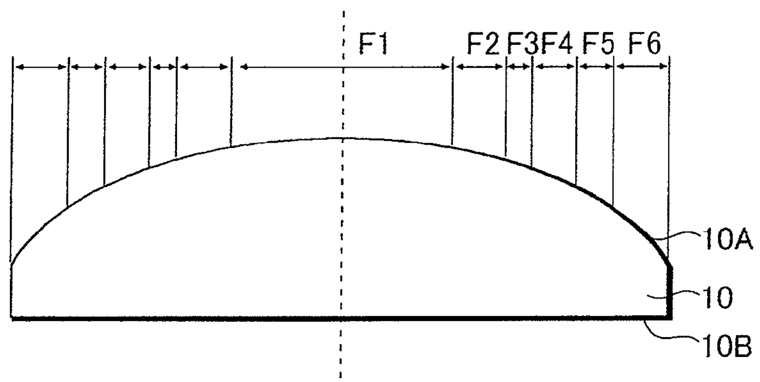
FIG. 1A is a cross-sectional view showing the objective lens.
FIG. 1B is a table for describing each region provided in the objective lens.

Referring to FIG. 1, an objective lens 10 according to the embodiment will be described. FIG. 1A is a cross-sectional view showing the objective lens 10, and FIG. 1B is a table showing characteristics of each region provided in the objective lens 10.

The objective lens 10 includes a first lens surface 10A and a second lens surface 10B, and a radiated laser beam passes through the objective lens 10 from the first lens surface 10A to the second lens surface 10B during operation. Moreover, the objective lens 10 is made of plastic or glass.

In the embodiment, the objective lens 10 focuses multiple laser beams having different wavelengths on information recording layers of optical discs. To put it specifically, the objective lens 10 focuses a laser beam of each of the blue-ray disc (BD) standard, the digital versatile disc (DVD) standard and the compact disc (CD) standard on an information recording layer of a corresponding optical disc.

Here, the wavelength of a laser beam of the BD standard is within the blue-violet (blue) wavelength range of 395 nm to 420 nm (405 nm, for example), and the wavelength of a laser beam of the DVD standard is within the red wavelength range of 645 nm to 675 nm (655 nm, for example). In addition, the wavelength of a laser beam of the CD standard is within the infrared wavelength range of 765 nm to 805 nm (785 nm, for example).

The laser beam incident on the objective lens 10 in this embodiment is infinite light or weak finite light. The infinite light is applied to an optical disc of each standard that includes a single information recording layer. The weak finite light is used in an optical disc of the BD standard or the DVD standard, which includes multiple information recording layers. A description of this matter will be given later in detail.

In the objective lens 10 of the embodiment, the first lens surface 10A is divided into multiple annular zone-shaped regions, and a predetermined laser beam is focused on each of the regions by the refraction effect on an information recording layer of an optical disc. To put it more specifically, the first lens surface 10A of the objective lens 10 is divided into a first region F1 to a sixth region F6 of an annular zone shape from the center toward the outer side of the objective lens 10A. As will be described later, the surface shape of each of the regions and a step height between the annular zones to be formed are determined in such a way that aberration of the laser beam of each of the standards is reduced.

The first region F1 is a circular region formed around a center portion of the first lens surface 10A of the objective lens 10 and focuses the laser beam of each of the BD, DVD and CD standards on an information recording layer of a corresponding optical disc. Note that, the first region F1 is formed in a circular shape in a region from the center of the objective lens 10 to 0.5928 mm in radius, and thus is formed into an annular zone partitioned by an annular zone step. Here, an annular zone step having a positive step amount is formed. In the embodiment, an annular zone step amount in the traveling direction of the laser beam incident on the objective lens 10 is denoted as a positive amount. Thus, when an annular zone step having a positive step amount is provided, the objective lens 10 on the outer side of the step is smaller in thickness. Meanwhile, when the annular zone step amount is negative, the objective lens 10 on the outer side of the step is larger in thickness.

The first region F1 is a region for focusing the laser beams of the BD, DVD and CD standards as described above, and the shape of the curve surface of this region is determined in such a way that the wavefront aberration of the BD standard and the DVD standard is reduced. This is because the negative influence of the wavefront aberration with the laser beams of the BD standard and the DVD standard is larger than that with the laser beam of the CD standard since the diameter of a spot formed by focusing the laser beams of the BD standard and the DVD standard is small.

In the first region F1, a single annular zone is formed. To put it specifically, in the first region F1, a circular region and an annular zone portion around the circular region are partitioned by an annular zone step. Here, the number of annular zones to be formed and the width of each of the annular zones are determined in such a way that spherical aberration occurring on a coating layer provided on an optical disc of the DVD standard is corrected by chromatic aberration occurring on the objective lens 10.

A step amount D of the annular zone formed in the first region F1 is calculated by using Formula 1 below.

$$D=m\cdot\lambda/(n-1) \qquad \text{Formula 1}$$

Here, m is an integer not less than 1, and n is a refractive index of the objective lens while λ is a wavelength of the laser beam. Note that, the detailed values used in designing of the actual objective lens 10 will be described later with reference to FIG. 6 and FIG. 7.

In the embodiment, the wavelength (405 nm) of the laser beam of the BD standard is used as the wavelength λ used in calculation of the step amount D of the annular zone step formed in the first region F1. To put it more specifically, 8 is employed as the value of m in Formula 1 described above, and 1.558701 is employed as the refractive index n of the objective lens with the wavelength of the BD standard. Thus, the presence or absence of a step has no influence on the practical wavefront aberration with the laser beam of the BD standard.

Meanwhile, a phase shifting on the laser beam of the DVD standard due to the provision of an annular zone step is not an integral multiple of the wavelength. Accordingly, chromatic aberration occurs with the laser beam of the DVD standard because of the provision of the annular zone step on the first region F1, and spherical aberration occurring on a coating layer of an optical disc is corrected by the chromatic aberration. Thus, the practical aberration of the laser beam of the DVD standard is reduced in the embodiment.

Another reason for using the wavelength of the BD standard in calculation of the step amount D is that calculation of the height of an annular zone on the basis of the wavelength of the laser beam of the BD standard, which has a short wavelength, makes it possible to reduce the size of the annular zone shape and also to achieve easier adjustment of the aberration of the laser beam of the DVD standard.

The second region F2 is an annular zone-shaped region (R=0.5928 mm to 0.932 mm) being adjacent to the first region F1 and surrounding the periphery thereof, and forms a spot by focusing each of the laser beams of the DVD standard and the CD standard on an information recording layer of a corresponding optical disc. Here, the point where the laser beams of the DVD standard and the CD standard are focused in the second region F2 is the same as the point where these laser beams are focused in the first region F1. To put it differently, the working distances of the respective regions coincide with each other. The same applies to the regions described below. Note that, the laser beam of the BD standard made incident on this region make no contribution to the spot formation.

Multiple annular zones are provided in the second region F2 and the step amount of an annular zone step provided between adjacent annular zones is calculated from the wavelength of the laser beam of the DVD standard. Here, an annular zone step having a negative height is formed. Thus, a cross-sectional shape in which an objective lens on the outer side of the annular zone step is larger in thickness is formed. Here, chromatic aberration occurs because of the provision of the annular zone step, and spherical aberration of the laser beam of the CD standard is corrected by the chromatic aberration. Meanwhile, the presence or absence of an annular zone step basically has no influence on the aberration of the laser beam of the DVD standard.

In the embodiment, a step is provided between the first region F1 and the second region F2. This is because the position of an outermost circumference portion of the first region F1 where aberration is optimized with the laser beams of the BD standard and the DVD standard does not coincide with the position of an innermost circumference portion of the second region F2 where aberration is optimized with the laser beams of the DVD standard and the CD standard. Here, a step is also provided between the second region F2 and the third region F3 for the same reason.

The third region F3 is an annular zone-shaped region (R=0.932 mm to 1.013 mm) being adjacent to the second region F2 and surrounding the periphery thereof, and forms a spot by focusing each of the laser beams of the BD standard and the DVD standard on an information recording layer of a corresponding optical disc. Note that, the laser beam of the CD standard incident on the third region F3 makes no contribution to the spot formation. Likewise, the laser beam of the CD standard incident on an outer side region than the third region F3 makes no contribution to the spot formation either.

Three annular zones are provided in the third region F3 and the step amount of a step formed between adjacent annular zones is calculated from the wavelength of the laser beams of the BD standard as in the case of the first region F1. Accordingly, in this region as well, the spherical aberration of the laser beam of the DVD standard is corrected by the chromatic aberration occurring because of the provision of the annular zone step.

The fourth region F4 is an annular zone-shaped region (R=1.013 mm to 1.08 mm) surrounding the third region F3, and forms a spot by focusing only the laser beam of the BD standard on the information recording layer of the corresponding optical disc. The laser beams of the DVD standard and the CD standard that are radiated on the fourth region F4 make no contribution to the spot formation. Accordingly, the spherical aberration of the laser beams of the standards other than the BD standard (DVD standard and CD standard) does not have to be taken into consideration, and no annular zone step is thus provided herein. Thus, the fourth region F4 exhibits a continuous surface including no step. The same applies to the fifth region F5 and the sixth region F6 to be described below, where a laser beam of only a specific standard are focused.

The fourth region F4 can reduce the amount of occurrence of aberration to be extremely small because association with the laser beams of the other standards does not have to be taken into consideration. The provision of such a region dedicated for the BD standard improves the aberration of the laser beam of the BD standard on the entire objective lens 10.

Here, the fourth region F4 may be provided with an annular zone to reduce the aberration with both of the BD standard and the DVD standard as in the case of the third region F3, obviously. However, in order to reduce the aberration with the BD standard efficiently, the fourth region F4 described above is preferably provided.

The fifth region F5 is an annular zone-shaped region (R=1.08 mm to 1.200 mm) surrounding the fourth region F4, and forms a spot by focusing only the laser beam of the DVD standard. The laser beams of the BD standard and the CD standard that are radiated on this region make no contribution to the spot formation. The provision of the fifth region F5, which is a region dedicated for focusing only the laser beam of the DVD standard, improves the aberration of the laser beam of the DVD standard. The reason for the improvement is the same as in the case of the fourth region F4.

Here, the fifth region F5 may be provided with an annular zone to reduce the aberration with both of the BD standard and the DVD standard as in the case of the third region F3, obviously. However, in order to reduce the aberration with the BD standard efficiently, the fifth region F5 described above is preferably provided.

Moreover, both of the fourth region F4 and the fifth region F5 may be provided with an annular zone to reduce the aberration with both of the BD standard and the DVD standard as in the case of the third region F3. However, in order to reduce the aberration with the BD standard and the DVD standard efficiently, the fourth region F4 and the fifth region F5 described above are preferably provided.

The sixth region F6 is an annular zone-shaped region (R=1.200 mm to 1.510 mm) surrounding the fifth region F5 and is a region used for focusing only the laser beam of the BD standard as in the case of the fourth region F4. The provision of such a region dedicated for focusing the laser beam of the BD standard in an outermost circumferential portion of the objective lens 10 further reduces the aberration of the laser beam of the BD standard as a whole.

Figure 2A:
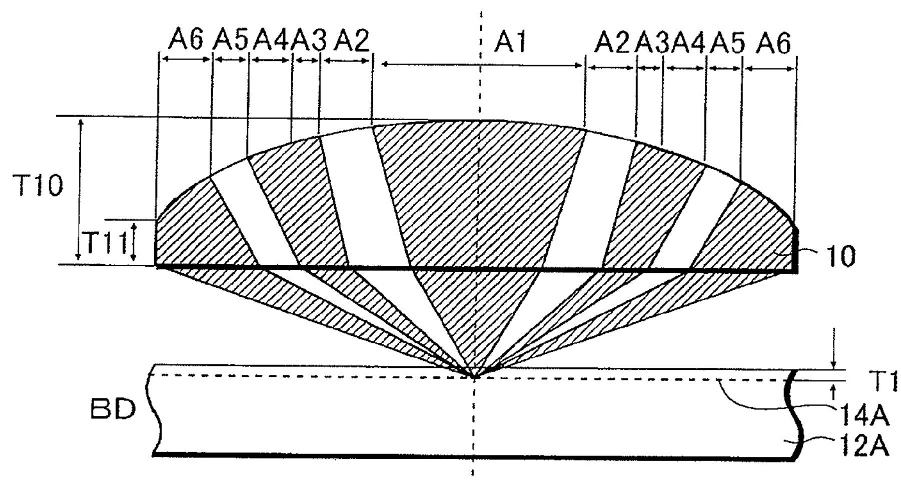
FIG. 2A shows how the laser beam of the BD standard is focused.
Figure 2B:
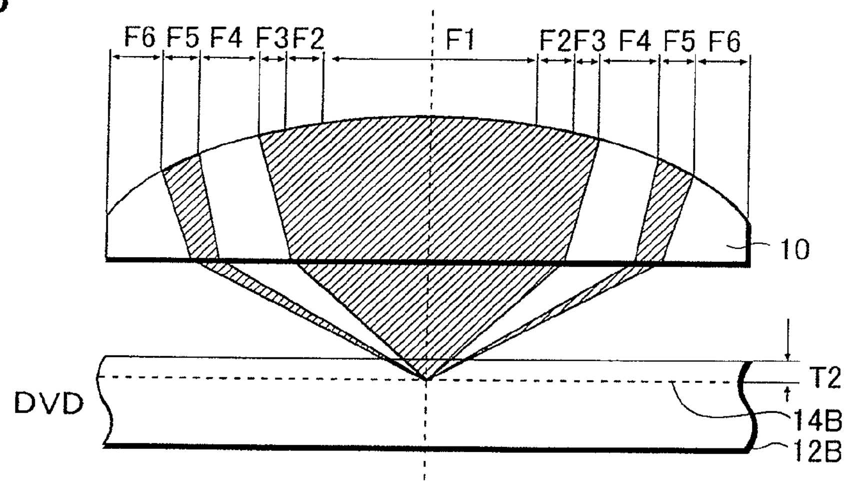
FIG. 2B shows how the laser beam of the DVD standard is focused.
Figure 2C:
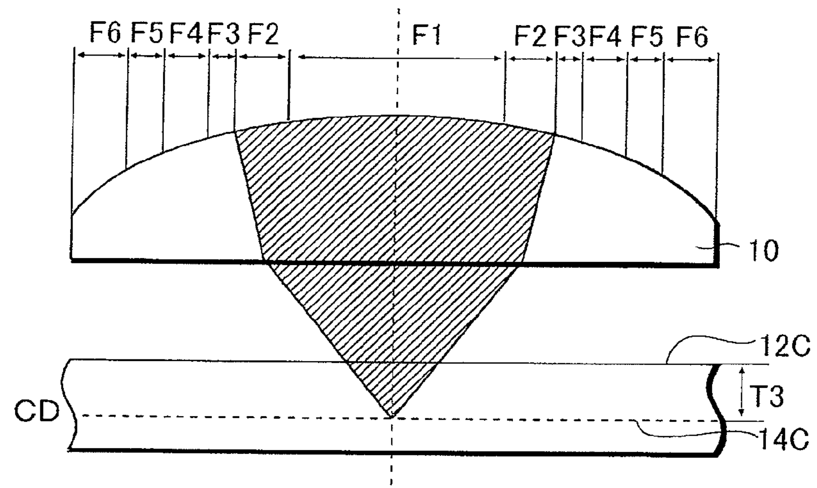
FIG. 2C shows how the laser beam of the CD standard is focused.

Referring to FIG. 2, how the laser beam of each of the standards is focused by the objective lens 10 will be described. Here, FIG. 2A is a cross-sectional view showing how the laser beam of the BD standard is focused on an optical disc 12A by the objective lens 10. FIG. 2B is a cross-sectional view showing the same for the DVD standard, and FIG. 2C is a cross-sectional view showing the same for the CD standard. Here, the portions where a laser beam forming a spot passes through are shown by hatching in each of FIG. 2. Meanwhile, no hatching is provided to the regions making no contribution to the spot formation.

Referring to FIG. 2A, the laser beam of the BD standard emitted from above are focused on an information recording layer 14A of the optical disc 12A of the BD standard by the objective lens 10 and thus forms a spot. Here, a thickness T1 of a coating layer that coats the information recording layer 14A of the optical disc 12A is 0.1 mm, for example.

As apparent from this drawing, the laser beam of the BD standard radiated on the objective lens 10 is not entirely focused on the optical disc 12A, and a portion of the laser beam radiated on the objective lens 10 makes no contribution to the spot formation. To put it specifically, portions of the laser beam radiated on the regions F1, F3, F4 and F6 of the objective lens 10 are focused on the information recording layer 14A of the optical disc 12A. Meanwhile, the second region F2 focuses only the laser beams of the DVD standard and the CD standard, so that the laser beam of the BD standard radiated on this region makes no contribution to the spot formation. Likewise, the fifth region F5 focuses only the laser beam of the DVD standard, so that the laser beam of the BD standard radiated on this region makes no contribution to the spot formation.

The reason why the laser beam of the BD standard on the second region F2 makes no contribution to the spot formation is as follows. Here, the shape of the second region F2 is determined in such a way that aberration is optimized with the laser beams of the DVD standard and the CD standard. Thus, the aberration of the laser beam of the BD standard is not taken into consideration at all. Accordingly, a phase shifting of approximately $-0.3\lambda$, for example, occurs in the laser beam of the BD, which passes through the second region F2. As a result, the laser beam of the BD standard radiated on the second region F2 makes no contribution to the spot formation. The fifth region F5 designed to focus only the laser beam of the DVD standard make no contribution to the spot formation of the BD standard for the same reason.

As described above, a super-resolution is achieved by setting the regions F2 and F5 to be the regions making no contribution to the spot formation while setting the regions F4 and F6 of the peripheral portions to be the regions dedicated for focusing the laser beam of the BD standard. Thus, it is possible to form the objective lens 10 with a thickness (T10) smaller than that of a conventional three-wavelength compatible lens. Moreover, the achievement of the super-resolution ensures a large thickness (T11) at an end portion of the objective lens 10. Here, the objective lens 10 is formed by injecting a resin member into a cavity formed in a die, so that the workability of this process can be improved by ensuring a large gate width through which the resin material is injected.

Note that, the use efficiency of the laser beam of the BD standard made incident on the objective lens 10 is approximately 40%, for example, and reading of information can be performed well with this use efficiency while writing can be also performed by using a high power laser.

Referring to FIG. 2B, when the laser beam of the DVD standard is radiated on the objective lens 10, portions of the laser beam emitted onto the regions F1, F2, F3 and F5 are focused on an information recording layer 14B of an optical disc 12B and form a spot. Meanwhile, since the fourth region F4 is a region for focusing only the laser beam of the BD standard, the laser beam of the DVD standard radiated on this region makes no contribution to the spot formation. Likewise, the laser beam of the DVD standard radiated on the sixth region F6 for focusing only the laser beam of the BD standard make no contribution to the spot formation. With this configuration, a super-resolution can be achieved with the laser beam of the DVD standard as well, and the same effect as in the case of the BD standard described above can be obtained.

Note that, the use efficiency of the laser beam of the DVD made incident on the objective lens 10 is approximately 80%, for example, and reading and writing of information can be performed well. In addition, a thickness T2 of a coating layer that coat the information recording layer 14B of the optical disc 12B of the DVD standard is 0.6 mm.

Referring to FIG. 2C, when the laser beam of the CD standard is radiated on the objective lens 10, only portions of the laser beam radiated on the first region F1 and the second region F2 are focused on an information recording layer 14C of an optical disc 12C and faun a spot. Meanwhile, the portions of the laser beam made incident on the regions F3, F4, F5 and F6 make no contribution to the spot formation.

Note that, the use efficiency of the laser beam of the CD standard made incident on the objective lens 10 is approximately 90%, for example, and reading and writing of information can be performed without any problem. In addition, a thickness T3 of a coating layer that coats the information recording layer coating layer 14C of the optical disc 12C of the DVD standard is 1.2 mm.

Figure 3A:
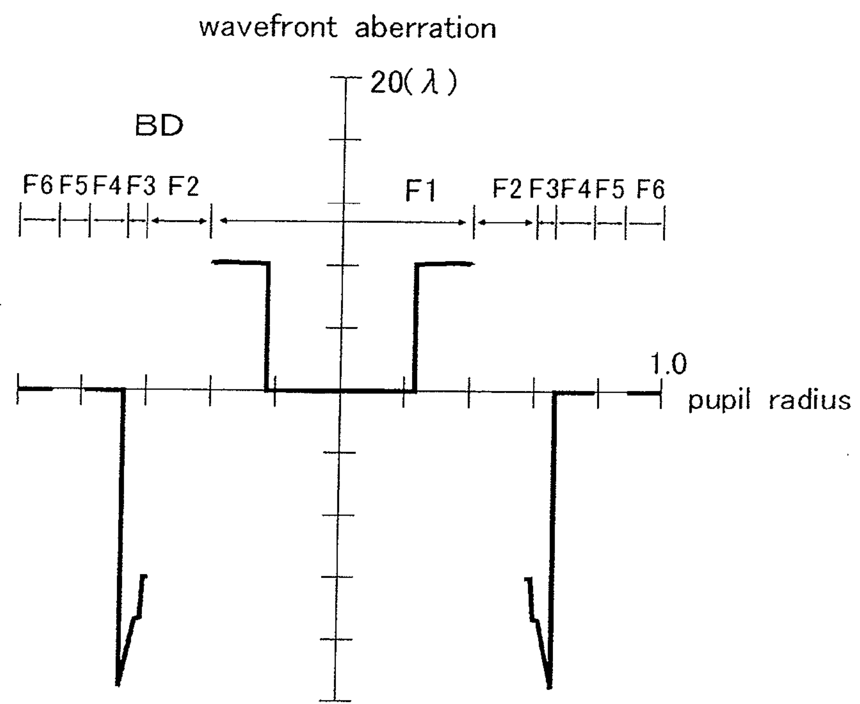
FIG. 3A is a graph showing aberration calculated from a difference in optical path length.
Figure 3B:
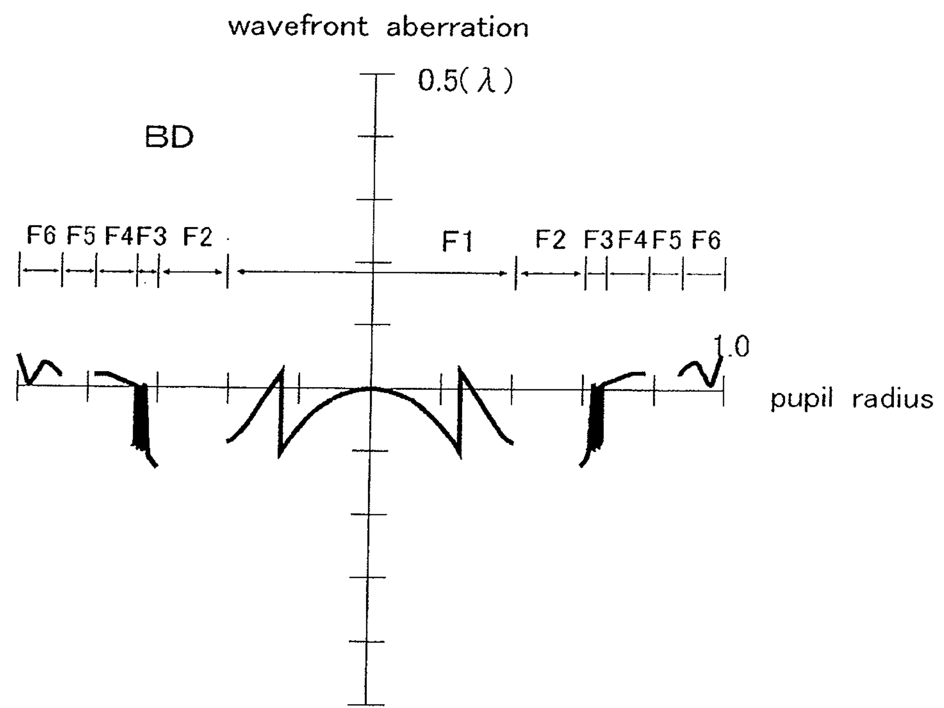
FIG. 3B is a graph showing aberration occurring actually.
Figure 4A:
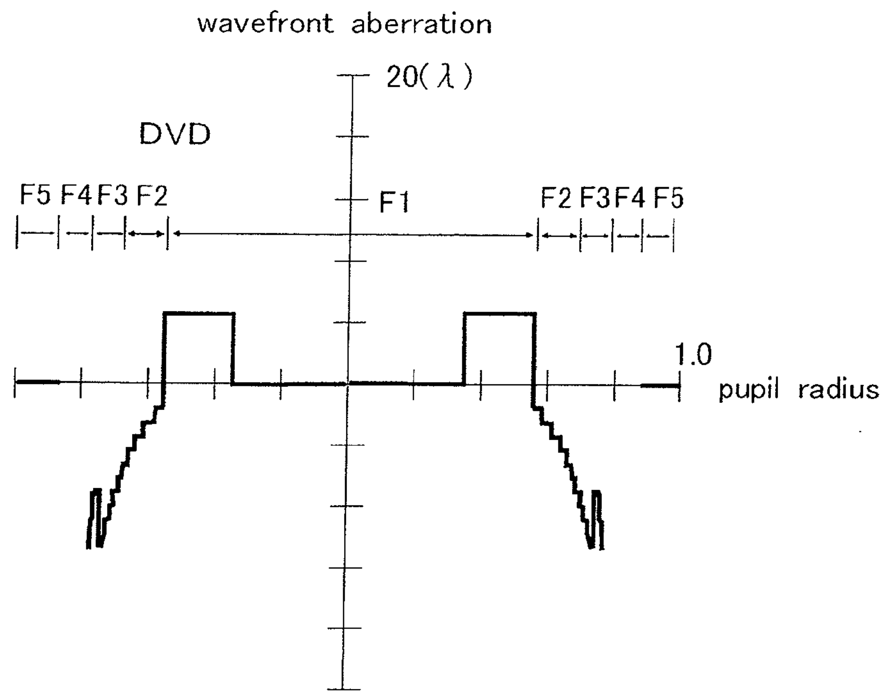
FIG. 4A is a graph showing aberration calculated from a difference in optical path length.
Figure 4B:
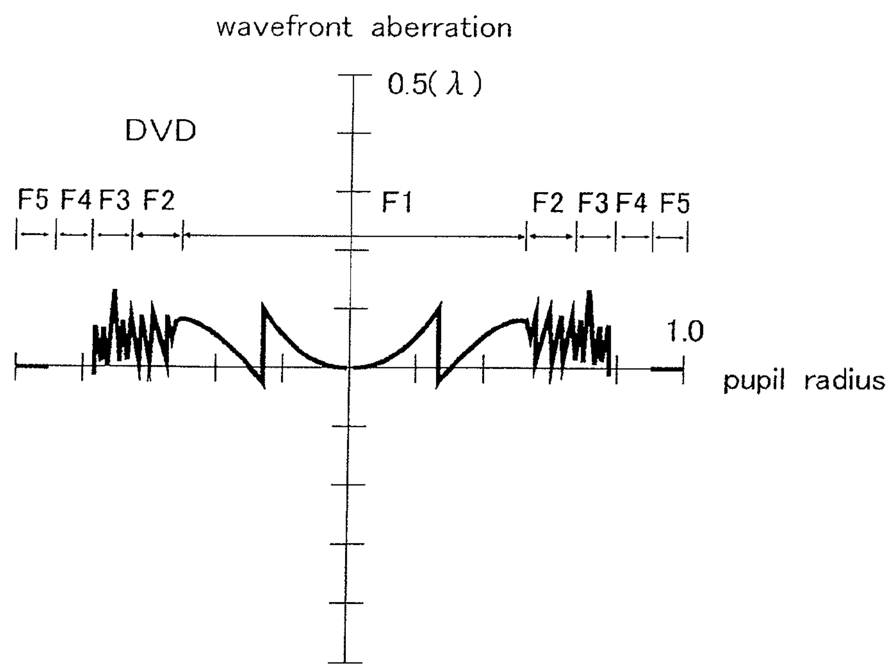
FIG. 4B is a graph showing aberration occurring actually.
Figure 5A:
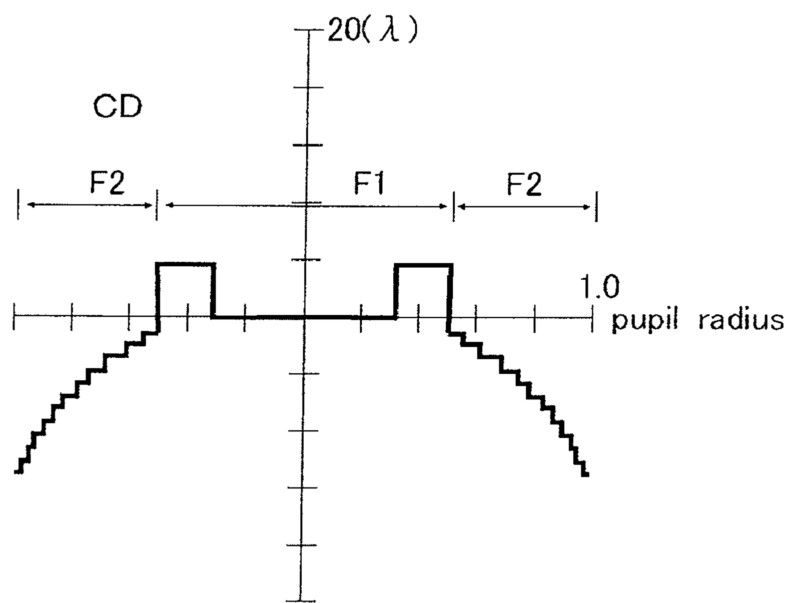
FIG. 5A is a graph showing aberration calculated from a difference in optical path length.
Figure 5B:
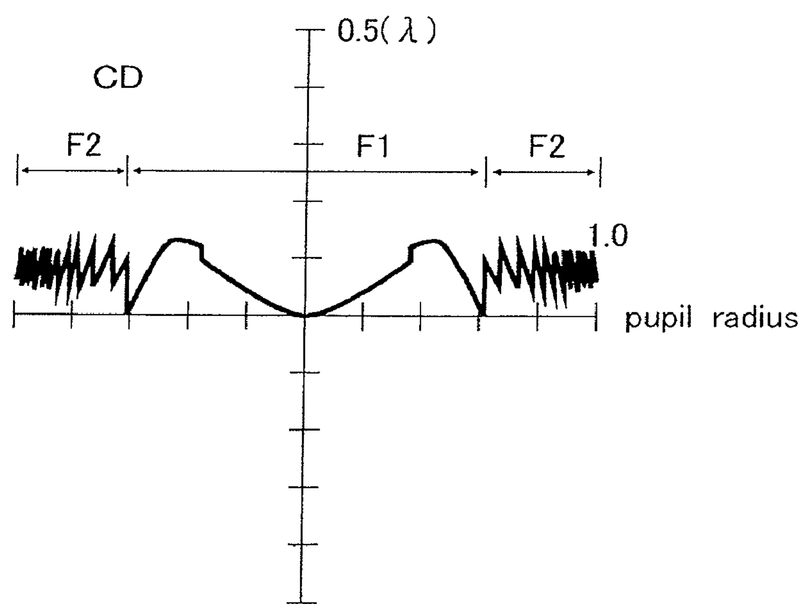
FIG. 5B is a graph showing aberration occurring actually.

Referring to FIG. 3 to FIG. 6, aberration occurring on the objective lens having the aforementioned configuration will be described. FIG. 3 show aberration of the laser beam of the BD standard, and FIG. 4 show aberration of the laser beam of the DVD standard. In addition, FIG. 5 show aberration of the laser beam of the CD standard. In the graphs shown in these drawings, the vertical axis shows the amount of aberration and the horizontal axis shows the pupil radius. Moreover, the value of aberration of the wavelength in accordance with a difference in optical path length is shown in each of FIGS. 3A, 4A and 5A while the value of aberration practically occurring is shown in each of FIGS. 3B, 4B and 5B by subtracting an integral multiple of a laser beam from the value shown in a corresponding one of FIGS. 3A, 4A and 5A. In addition, the values of aberration shown in the drawings are each obtained by adding aberration occurring on the objective lens and aberration occurring on a coating layer that coats an information recording layer of an optical disc.

Referring to FIG. 3A, with the laser beam of the BD standard, the aberration changes in accordance with the shape of the curve surface of the objective lens and an annular zone height. To put it specifically, in the first region F1, a wavefront aberration of approximately $10\lambda$ occurs in accordance with the height of an annular zone step at a position where the annular zone step is provided. However, the height of the annular zone step is calculated on the basis of the wavelength of the laser beam of the BD standard, so that the presence of this annular zone step has no large influence on the aberration with the BD standard.

Moreover, no aberration in the second region F2 is shown in this graph. This is because the second region F2 is a region for focusing only the laser beams of the DVD standard and the CD standard, and the laser beam of the BD standard that passes through this region make no contribution to the spot formation.

In the third region F3, an annular zone step is formed with a negative height. Thus, negative aberration occurs in accordance with the shape of the step.

The fourth region F4 and the sixth region F6 are regions for focusing only the laser beam of the BD standard and thus can be designed in such a way that no aberration occurs with the wavelength of the BD standard. Thus, the amount of aberration occurring in these regions is extremely small.

Meanwhile, no value of aberration is shown in the fifth region F5. This is because the fifth region F5 is a region for focusing only the laser beam of the DVD standard, and the laser beam of the BD standard radiated on this region makes no contribution to the spot formation.

Referring to FIG. 3B, in the first region F1, the value of wavefront aberration gradually increases in the negative direction as the position separates from the center portion, and the value increases in the position direction at a portion where the annular zone step is provided. Thereafter, as the position separates from the center portion, the value of the wavefront aberration increases in the negative direction again.

As described above, the surface of the first region F1, which is located at the center portion of the objective lens 10, is designed in such a shape that the wavefront aberration is reduced with the laser beams of the BD standard and the DVD standard. To put it differently, the remaining aberration is shared by the laser beam of the BD standard and the laser beam of the DVD standard by providing the annular zone step. Thus, the aberration of the laser beam of the BD standard in the first region F1 is not zero, and negative aberration slightly occurs.

In addition, the aberration with the BD standard is shifted in the first region F1 in the positive direction at a portion where the annular zone step is provided, and the reasons for this shifting is as follows. First, the annular zone step provided in the first region F1 located in a center position is calculated on the basis of the wavelength of the laser beam of the BD standard, so that the presence or absence of this step basically has no influence on the aberration of the laser beam of the BD standard. However, in order to match the working distances of the first region F1 and the second region F2, the surface shape of the first region F1 is adjusted. As a result, the surface shape of the first region F1, and the height of the annular zone step changes. Thus, the aberration of the laser beam of the BD standard is shifted at the position where the annular zone step is provided.

The second region F2 is a region that makes no contribution to the spot formation by the laser beam of the BD standard. Thus, no value of aberration is shown. The same applies to the fifth region F5.

The third region F3 is a region for focusing the laser beam of the BD standard and the laser beam of the DVD standard. In the third region F3, the height of an annular zone step is calculated on the basis of the laser beam of the BD standard, and the surface of the region is formed into such a shape that the aberration is shared by the two standards. As a result, negative aberration slightly occurs in the third region F3. In addition, as in the case of the first region F1, the surface shape is adjusted in the third region F3 in consideration of the working distance with the other regions. As a result, the value of aberration is shifted at the position where the annular zone step is provided.

The fourth region F4 and the sixth region F6 are regions for focusing only the laser beam of the BD standard and thus can be each designed in such a shape that aberration barely occurs in the region. However, slight aberration occurs in the position direction in reality. Such aberration is attributable to that the surfaces of these regions are each formed in such a shape that the working distance of the region matches those of the other regions including the first region F1 and the like, as in the case of the first region F1.

As described above, the aberration of the laser beam of the BD standard is extremely small and an RMS (Root Mean Square) wavefront aberration becomes 0.031 ma. RMS if the coating layer of the optical disc is 0.0875 mm. While an RMS wavefront aberration not greater than 0.07 mλ RMS is considered to be favorable with the Marechal criterion in general, even a smaller value smaller is achieved in the embodiment. Accordingly, reading and writing of information to and from an optical disc of the BD standard can be performed well.

Referring to FIG. 4, aberration of the laser beam of the DVD standard will be described. In the graphs shown in the drawings, aberration is shown in a range from the first region F1 to the fifth region F5 for focusing the laser beam of the DVD standard. Note that, since the sixth region F6 is a region for focusing only the laser beam of the BD standard, the laser beam of the DVD standard radiated on this region makes no contribution to the spot formation.

Referring to FIG. 4A, in the case of the laser beam of the DVD standard as well, aberration is shifted in accordance with the height of an annular zone step formed on the objective lens. To put it specifically, the value of wavefront aberration increases by approximately 5λ at the position where the annular zone step is provided. Then, since an annular zone step is formed at the boundary between the first region F1 and the second region F2, the aberration decreases in accordance with the height of this step. Furthermore, the value of aberration changes in a staircase pattern in accordance with the formed annular zone steps in the second region F2. Additionally, in the third region F3, the aberration changes in the position direction while being affected by an annular zone step having a height calculated on the basis of the wavelength of the BD standard. Meanwhile, since the fourth region F4 is a region for focusing only the laser beam of the BD standard, the laser beam of the DVD standard radiated on this region makes no contribution to the spot formation. In addition, since the fifth region F5 is a region for focusing only the laser beam of the DVD standard, the aberration occurring in this region is extremely small.

Referring to FIG. 4B, since the surface of the first region F1 is basically designed in such a shape that the aberration with the laser beam of the BD standard is reduced as described above, spherical aberration occurs with the laser beam of the DVD standard. To put it specifically, the spherical aberration increases in the positive direction as the pupil radius increases. Then, the value of the aberration is shifted in the negative direction and thus corrected at the position where an annular zone step is provided. Moreover, the aberration increases in the position direction in an outward direction in an outer side region from the annular zone step. As described, the reason why the aberration is corrected in the negative direction at the portion of the annular zone step is that the height of this annular zone step is calculated on the basis of the wavelength of the laser beam of the BD standard.

Moreover, as obvious from this drawing, the aberration of the laser beam of the DVD standard shows a positive value in a large portion except for the portion where the aberration is shifted in the negative direction because of the annular zone step. In the embodiment, a large portion of the aberration of the laser beam of the BD standard is set to a negative value while a large portion of the aberration of the laser beam of the DVD standard is set to a positive value in the first region F1. Accordingly, the aberration of both of the BD standard and the DVD standard is reduced.

The second region F2 is a region for focusing the laser beams of the DVD standard and the CD standard as described above, and multiple annular zones are provided therein. Then, the annular zone height of each of the annular zone steps provided in this region is calculated on the basis of the wavelength of the laser beam of the DVD standard, which is a relatively short wavelength. However, as a result of forming the surface of this region into such a shape that the aberration is shared by the laser beam of the CD standard and the laser beam of the DVD standard, aberration in the positive direction slightly occurs with the laser beam of the DVD standard in this region as well. Moreover, as a result of adjustment of the surface shape to match its working distance with those of the other regions, the height of each of the annular zone steps in this region changes, and the aberration with the laser beam of the DVD standard is shifted at the position where the annular zone step is provided.

In the third region F3, as a result of determining the annular zone step on the basis of the wavelength of the laser beam of the BD standard, the spherical aberration of the laser beam of the DVD standard is shifted by chromatic aberration and thus corrected as in the case of the first region F1.

Since the fourth region F4 is a region for focusing only the laser beam of the BD standard, the laser beam of the DVD standard made incident on this region make no contribution to the spot formation. Accordingly, no aberration in the fourth region F4 is shown in this graph.

Since the fifth region F5 is a region for focusing only the laser beam of the DVD standard, the aberration occurring in this region is extremely small.

Here, the RMS wavefront aberration of the laser beam of the DVD standard is 0.040 mλ. RMS if the coating layer of the optical disc has a thickness of 0.6 mm, and this RMS wavefront aberration sufficiently satisfies the above described Marechal criterion.

Referring to FIG. 5, the aberration of the laser beam of the CD standard will be described. Here, the aberration occurring in the first region F1 and the second region F2 is shown. The laser beam of the CD standard radiated on an outer side region from the second region F2 make no contribution to the spot formation, so that the laser beam are not illustrated herein.

Referring to FIG. 5A, the aberration changes in the first region F1 in accordance with an annular zone step calculated on the basis of the wavelength of the laser beam of the BD standard. In addition, the aberration changes in the second region F2 in accordance with annular zone steps calculated on the basis of the wavelength of the laser beam of the DVD standard.

Referring to the effective value of the aberration shown in FIG. 5B, the aberration slightly increases at the position where the annular zone step is provided and its peripheral region in the first region F1, but the aberration occurring in this region is approximately 0.1λ at the maximum.

In the second region F2, the amount of each of the annular zone steps is calculated on the basis of on the wavelength of the laser beam of the DVD standard, so that the spherical aberration of the laser beam of the CD standard is corrected by chromatic aberration of the objective lens. As a result, the aberration shows such a small value.

Here, the RMS wavefront aberration of the laser beam of the CD standard is 0.034 ink RMS if the coating layer of the optical disc has a thickness of 1.2 mm, and this RMS wavefront aberration sufficiently satisfies the above described Marechal criterion.

Referring to FIG. 6 and FIG. 7, the specific shape of the objective lens 10 described above will be described. The tables shown in FIG. 6 and FIG. 7 show coefficients indicating the shape and characteristics of the thus realized objective lens 10.

FIG. 6A and FIG. 6B show reflective indices and surface intervals of an optical pickup lens (objective lens) and optical transparent layer (coating layer) in an optical disc with the wave lengths of the BD standard, the DVD standard and the CD standard. Here, an opening size Φ and surface intervals d2 and d3 are as shown in FIG. 6E.

Moreover, FIG. 6C shows the temperature characteristics of a lens material and the transparent layer in the disc with the wavelength of each of the standards. FIG. 6D shows the material wavelength characteristics of the lens material and the transparent layer in the disc.

FIG. 7 show parameters defining the shape of the lens surface. FIG. 7A shows parameters defining the shape of a lens surface R1 (the first lens surface 10A shown in FIG. 1A) where multiple annular zones are provided. FIG. 7B shows parameters defining the shape of a lens surface R2 (the second lens surface 10B shown in FIG. 1A) of the objective lens.

Referring to FIG. 7A, the shape of the lens surface is determined by assigning each parameter shown in the table in Formula 2 below.

[Equation 1]

Formula 2

$$Zx = \frac{h1^2}{R1\left[1+\sqrt{1-\frac{(1+K1)h1^2}{R1^2}}\right]} + A_1 0h1^0 + A_1 4h1^4 + A_1 6h1^6 + A_1 8h1^8 + A_1 10h1^{10} + A_1 12h1^{12} + A_1 14h1^{14} + A_1 16h1^{16} \ldots$$

In Formula 2, the positive signs correspond to the area from the surface R1 to the surface R2 shown in FIG. 6E, h1 is the height (mm) from the optical axis, and a numerical value of an annular zone x including h (mm) is used for an aspherical coefficient.

The table shown in FIG. 7A shows a wavelength of each laser beam to be focused, a degree m and a wavelength used in calculation of the annular zone height by using Formula 1, and an annular zone start radius, an annular zone end radius, and the coefficients used in calculation of the shape for each annular zone. Here, annular zones 1 and 2 correspond to the first region F1 shown in FIG. 1A, annular zones 3 to 13 correspond to the second region F2, annular zones 14 to 16 correspond to the third region F3, an annular zone 17 corresponds to the fourth region F4, an annular zone 18 corresponds to the fifth region F5, and an annular zone 19 corresponds to the sixth region F6.

In addition, the shape of the lens surface R2 is determined by assigning coefficients shown in FIG. 7B in Formula 3 below.

[Equation 2]

Formula 3

$$Zx = \frac{h2^2}{R2\left[1+\sqrt{1-\frac{(1+K2)h2^2}{R2^2}}\right]} + A_2 4h2^4 + A_2 6h2^6 + A_2 8h2^8 + A_2 10h2^{10} + A_2 12h2^{12} + A_2 14h2^{14} + A_2 16h2^{16} \ldots$$

In Formula 3, h2 is the height (mm) from the optical axis, and a numerical value of the surface R2 is used for an aspherical coefficient.

Figure 8:
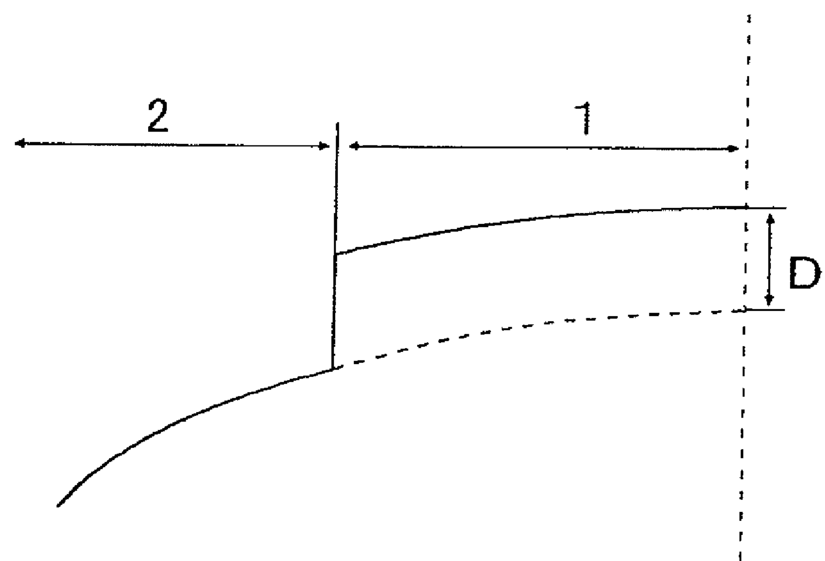
FIG. 8 is a diagram showing an annular zone step included in the objective lens of the preferred embodiment.

Referring to FIG. 8, the height of each annular zone is calculated with respect to the center of the objective lens in such a way that Formula 1 above holds true, and the surface shape of each annular zone is optimized thereafter. Accordingly, a height D of an annular zone step provided between the annular zone 1 and the annular zone 2 is calculated by assigning m/wavelength=8/405 in Formula 1. The value shows a step amount between the center portion of the lens and a virtually extended surface in a case where the surface of the annular zone 2 is virtually extended and thus widened to the center of the lens.

Note that, referring to the table in FIG. 7A, when the annular zone 3 and the annular zone 4 are compared, the annular zone step of the annular zone 3 is the value obtained by assigning m/wavelength=−2/660 in Formula 1, and the annular zone step of the annular zone 4 is the value obtained by assigning m/wavelength=−3/660 in Formula 1. These values are obtained using the center of the objective lens as the reference as described above. Thus, the height of the annular zone step provided between these annular zones is a difference between the step amounts obtained by assigning the respective values in Formula 1.

The objective lens 10 according the embodiment has been described above.

The embodiment is characterized in that the first region F1 for focusing the laser beams of the three standards is formed into a shape that reduces aberration with both of the laser beam of the BD standard and the laser beam of the DVD standard.

To put it specifically, referring to FIG. 1, the first region F1 focuses each of the laser beams of the BD standard, the DVD standard and the CD standard on an information recording layer of a corresponding optical disc. Here, the surface of the first region F1 is basically designed in such a shape that no aberration occurs with the laser beam of the BD standard. This is because the negative influence of aberration is large in the case of the BD standard using the smallest spot diameter. In this case, spherical aberration occurs with the laser beam of the DVD standard in which the thickness of a coating layer of an optical disc is relatively large. For this reason, an annular zone step having a height calculated on the basis of the wavelength of the laser beam of the BD standard is provided in the first region F1, and the spherical aberration is corrected by chromatic aberration occurring because of this step. Thus, as shown in FIG. 4B, the aberration of the laser beam of the DVD standard is shifted in the negative direction at the position where the annular zone step is provided in the first region F1. As a result, the aberration of the laser beam of the DVD standard in the first region F1 is reduced.

As a result of employing the aforementioned configuration, it is made possible to efficiently focus each of the laser beams of the standards on an information recording layer of a corresponding optical disc by the refraction effect of the objective lens 10. Accordingly, the use efficiency of the laser beams becomes high as compared with the related art using the diffraction effect in focusing the laser beams, thereby, improving the reading accuracy and writing accuracy of information.

In this embodiment, in order to further improve the aberration of the laser beam of the DVD standard, the surface of the first region F1 is formed into such a shape that aberration is shared by the laser beam of the BD standard and the laser beam of the DVD standard. Thus, although aberration with the laser beam of the BD standard occurs slightly, the aberration of the laser beam of the DVD standard has a favorable value. Referring to FIG. 3B, slight aberration occurs with the laser beam of the BD standard in the first region F1. Note that, in a case where the surface of the first region F1 is set in such a shape that no aberration occurs with the laser beam of the BD standard without taking into account the aforementioned factor, aberration in this region becomes zero. Even when the aberration of the laser beam of the BD standard is slightly deteriorated in the first region F1, the aberration of the laser beam of the BD standard as the whole objective lens 10 is kept at a level not greater than a certain level because the aberration is improved in the fourth region F4 and the sixth region F6 for focusing only the laser beam of the BD standard.

The same applies to the second region F2 and the third region F3. To put it specifically, in a case where the laser beams of plural standards are to be focused on a single region, first, the surface of the region is designed in such a shape that no aberration occurs with the laser beam of the shorter wavelength. Next, an annular zone height is determined on the basis of the laser beam of the shorter wavelength in such a way that spherical aberration occurring due to a difference in thickness between coating layers included in optical discs is corrected. Then, the surface of the region is formed into such a shape that the aberration is shared by the laser beams of both of the wavelengths in order to further improve the aberration of the laser beam of the longer wavelength.

To put it more specifically, the annular zone height is determined on the basis of the wavelength of the laser beam of the DVD standard in the second region F2, and the surface of this region is formed into such a shape that aberration is shared by the laser beam of the DVD standard and the laser beam of the CD standard. Thus, the aberration of the laser beams of both of the standards is reduced to a value not greater than a predetermined value. Likewise, in the third region F3, an annular zone height is calculated on the basis of the wavelength of the laser beam of the BD standard. Thereafter, the surface of the region is formed into such a shape that aberration is shared by the laser beam of the BD standard and the laser beam of the DVD standard.

Here, an annular zone step is provided in this embodiment for correcting the spherical aberration occurring due to a difference in thickness between coating layers of optical discs depending on the standards, and the height of the annular zone step is allowed to vary within a certain range.

To put it more specifically, in order to find the step amount D in the first region F1, the value of the wavelength ($\lambda$) to be assigned in Formula 1 described above does not have to be necessarily 405 nm of the BD standard, and may be changed within a range of 395 nm to 420 nm, for example. Here, if the wavelength used in calculation of the step amount is slightly changed in the manner described above, the aberration of the laser beam of the DVD standard or the CD standard other than the BD standard is improved. The same applies to the second region F2 and the third region F3, and the wavelength used in calculation of the step amount is changeable within a range of 645 nm to 675 nm for the DVD standard.

Moreover, the surfaces of the aforementioned regions are each formed in such a shape that the working distance of the laser beam focused on the region matches the working distances in the other regions in this embodiment. For example, referring to FIG. 2B, the first region F1 and the third region F3 are both regions for focusing the laser beam of the BD standard, but there is a case where the working distances of the first region F1 and the third region F3 are different as a result of designing the surface of each of the regions in the shape described above. To put it specifically, there is a case where the position where the laser beam of the BD standard focused in the first region F1 form a spot is different from the position where the laser beam of the BD standard focused in the third region F3 form a spot. Here, in order to match the positions, the surface shapes of the respective regions are adjusted to match the working distances. In this case, a slight change occurs in annular zone steps. As a result, as shown in FIG. 3B, the values of aberration of the laser beam of the BD standard at the positions where the annular zone steps are provided are shifted in the first region F1 and the third region F3. However, the amounts of the shifting are so small that the aberration of the laser beam of the BD standard as a whole is not deteriorated considerably.

The embodiment is further characterized in that the laser beams of the standards that are infinite light or weak finite light are focused on the objective lens 10. Here, in the case of weak finite light, the objective lens is designed in such a way that the minimum aberration when infinite light enters the objective lens designed in accordance with weak finite light does not exceed the Marechal criterion.

Infinite light is used when reading or writing of information is performed on an optical disc of each of the standards that includes a single information recording layer. In case of an optical disc having a single information recording layer, stable reading and writing can be performed by using infinite light because a coating layer that coats the information recording layer has a constant thickness. Infinite light is generated by a collimating lens installed in an optical path through which a laser beam passes in an optical pickup apparatus.

Weak finite light is used in focusing a laser beam on layers of an optical disc of the BD standard or the DVD standard that include multiple information recording layers. To put it specifically, in a case of an optical disc of the BD standard that includes two information recording layers, the thickness of a coating layer for coating the information recording layer closer to the surface of the optical disc is 0.075 mm while the thickness of a coating layer for coating the information recording layer distant from the surface thereof is 0.100 mm. In this case, the objective lens is designed in such a way that the focal point is 0.0875 mm, which corresponds to the thickness at the intermediate position of the coating layers of the optical disc using two information recording layers, while using a laser beam of inifint light. Then, a laser beam of weak finite light is made incident on the objective lens, and thereby, the laser beam is focused on and forms a spot on the information recording layers for performing reading or writing.

In addition, in a case of an optical disc of the BD standard that includes four information recoding layers, the topmost information recoding layer is coated by a coating layer having a thickness of 0.050 mm, while the deepest information recoding layer is coated by a coating layer having a thickness of 0.105 mm. In this case, the objective lens is designed in such a way that the laser beam of infinite light is focused on an information recording layer coated by a coating layer having a thickness of 0.0775 mm, which corresponds to the intermediate value between both of the aforementioned coating layers. Then, by use of weak finite light as an incident laser beam, the laser beam is focused on a desired information recoding layer.

The aforementioned weak finite light is created by moving the collimating lens installed in the optical path of the laser beams. To put it another way, the weak finite light shows divergent light and convergent light incident on the objective lens at an angle required for displacing the focal point of the objective lens on each of the information recording layers of the optical discs when infinite light is emitted, the focal point being set to a thickness at the intermediate position between the information recording layers of a multilayer disc.

Figure 9:
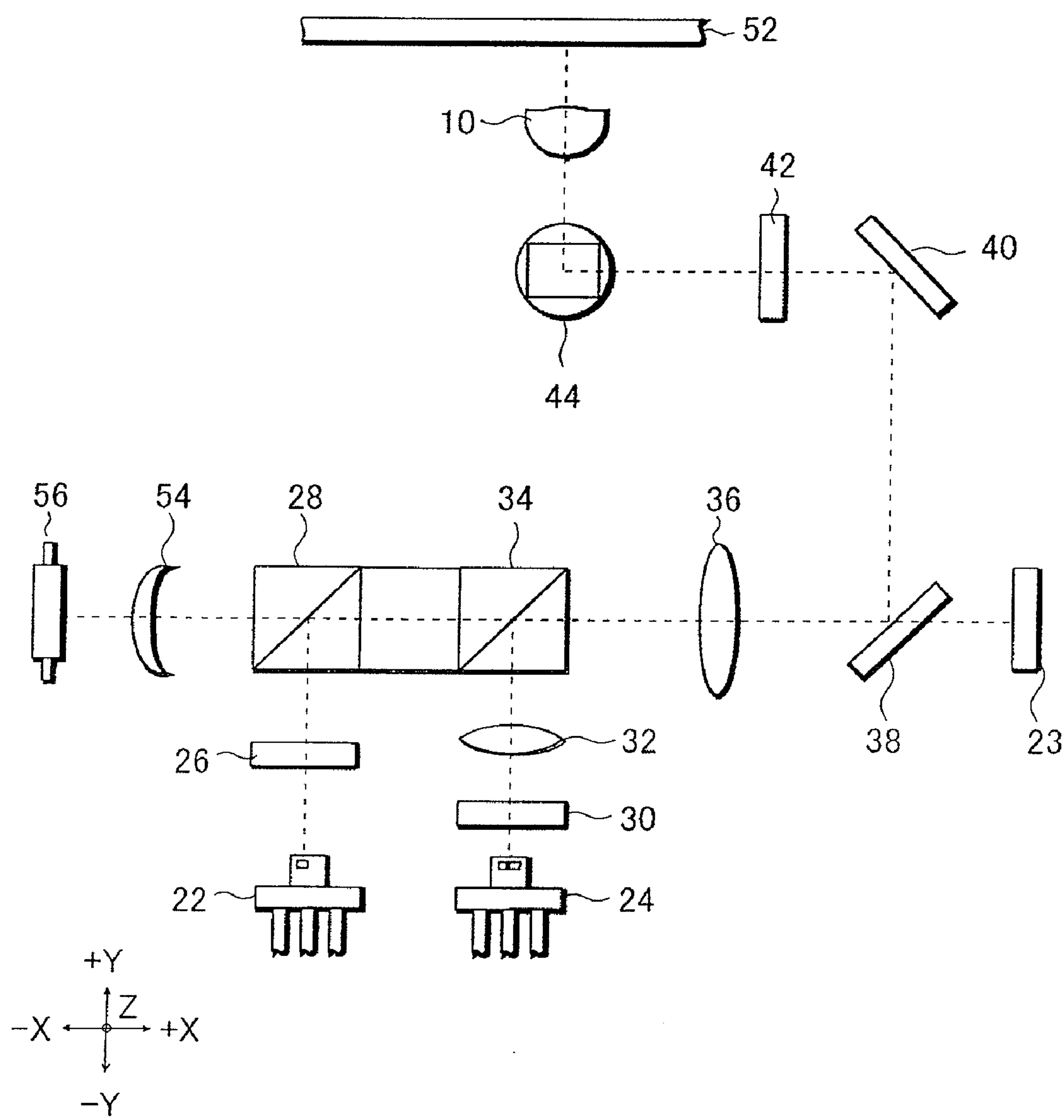
FIG. 9 is a diagram showing an optical pickup apparatus including the objective lens of the preferred embodiment.

Referring to FIG. 9, a description will be given of a configuration of an optical pickup apparatus 20 including the objective lens 10 having the configuration described above. The optical pickup apparatus 20 has a function to focus the laser beams of the BD standard, the DVD standard or the CD standard on an information recording layer of an optical disc 52, then to receive reflected light from the information recording layer and to convert the received light into electric signals. With this function, the optical pickup apparatus 20 performs reading and writing of information from and to the optical disc 52 of each of the standards.

A description will be given of elements included in the optical pickup apparatus 20 of the embodiment.

A laser device 22 emits the laser beam of the wavelength of the BD standard. A laser device 24 emits the laser beams of the wavelengths of the DVD standard and the CD standard.

A diffraction grating 26 is placed between the laser device 22 and a composite prism 28, and the laser beam of the BD standard is made incident on the diffraction grating 26. In addition, the diffraction grating 26 is configured of: a diffraction grating to separate the incident laser beams into 0th order light, +1st order diffracted light, and −1st order diffracted light; and a half-wavelength plate configured to convert the incident laser beam into a beam linearly-polarized in an S direction with respect to a polarization surface of the composite prism 28. Likewise, a diffraction grating 30 is placed between the laser device 24 and a composite prism 34 and is configured of a diffraction grating and a half-wavelength plate. Note that, the diffraction grating 30 is configured to convert the laser beams of the DVD standard and the CD standard into the beam linearly-polarized in the S direction with respect to a polarization surface of the composite prism 34.

A divergent lens 32 is placed between the diffraction grating 30 and the composite prism 34 and is configured to adjust a spread angle of the laser beam diffracted by the diffraction grating 30.

The composite prism 28 incorporates a polarization surface that has wavelength selectivity and polarization selectivity and thus functions as a polarization splitter for the laser beam of the BD standard and as a total transmission prism for the laser beams of the DVD standard and the CD standard. To put it specifically, the laser beam of the BD standard as the beam linearly-polarized in the S direction is reflected to a +X direction in FIG. 9 by the polarization surface. Meanwhile, the laser beam (returning beam) reflected by the optical disc 52 is a beam linearly-polarized in a P direction and passes through the polarization surface in a −X direction in FIG. 9.

The composite prism 34 incorporates a polarization surface that has wavelength selectivity and polarization selectivity and thus functions as a polarization splitter for the laser beams of the DVD standard and the CD standard and as a total transmission prism for the laser beam of the BD standard. To put it specifically, the composite prism 34 adjusts the reflectivity of the laser beams of the DVD standard and the CD standard and thereby adjusts the light amount of a second laser beams to be guided to a PDIC 56. Then, a large portion of the laser beams of the DVD standard and the CD standard, which are the beams linearly-polarized in the S direction, is reflected to the +X direction in FIG. 9 by the polarization plane. Meanwhile, the laser beams of the DVD standard and the CD standard reflected by the optical disc is the beam linearly-polarized in the P direction and certain percentage thereof pass through the polarization surface in the −X direction in FIG. 9.

A collimating lens 36 converts the laser beams of the BD standard, the DVD standard and the CD standard into infinite light. The collimating lens 36 moves in a direction parallel to an optical path (optical axis) shown by a dotted line (±X direction in the drawing). In addition, the collimating lens 36 optimizes the optical magnification in accordance with the laser beam of each of the standards and thereby suppresses occurrence of interlayer stray light or interlayer crosstalk. In addition, the laser beams can be converted into weak finite light by moving the collimating lens 36.

A reflective mirror 38 has wavelength selectivity and polarization selectivity. To put it specifically, the reflective mirror 38 transmits a part of the laser beam in the outward path to be radiated on an FMD 23.

The FMD 23 receives the laser beam on the outward path that has passed through the reflective mirror 38, and outputs a signal indicating the light amount of the received laser beam. Accordingly, the laser devices 22 and 24 are controlled on the basis of the output of the FMD 23.

A reflective mirror 40 totally reflects the laser beam of each of the standards on the outward path to the −X direction in FIG. 9. Likewise, the reflective mirror 40 totally reflects the laser beam (returning beam) on the returning path, which has been reflected by the optical disc 52, to a −Y direction in FIG. 9.

A quarter-wavelength plate 42 causes a phase difference in the incident laser beam and converts the laser beam of each of the standards as the beam linearly-polarized in the S direction into a circularly-polarized beam. Meanwhile, the laser beam reflected by the optical disc 52 (returning beam) is converted into the laser beam as the beam linearly-polarized in the P direction after passing through the quarter-wavelength plate 42 again.

A reflecting mirror 44 reflects the laser beam of each of the standards to a +Y direction in FIG. 9.

The objective lens 10 focuses the laser beams of the BD standard, the DVD standard and the CD standard that are reflected by the reflecting mirror 44 on an information recording layer of the optical disc 52.

An anamorphic lens 54 is placed between the composite prism 28 and the PDIC 56, and the laser beam (returning beam) of each of the standards, which is reflected by the optical disc 52, passes through the anamorphic lens 54. The anamorphic lens 54 then gives astigmatism for focus servo to the laser beam passing therethrough so as to allow the laser beam of each of the standards to be processed by the single PDIC 56.

The PDIC 56 is a photodetector in which a photodiode integrated circuit element for detecting signals is embedded and receives the laser beam of each of the standards on a light receiving region on a single surface and then outputs a detection signal including an information signal component by photoelectric conversion. Furthermore, the PDIC 56 outputs a detection signal including a servo signal component used in focus servo and tracking servo.

Next, a description will be given of an optical path of the laser beams of the DVD standard and the CD standard.

First, the laser beam emitted from the laser device 24 is made incident on the composite prism 34 after being converted into the beam linearly-polarized in the S direction by the diffraction grating 30 and being adjusted to have a predetermined spread angle by the divergent lens 32. Thereafter, the laser beam is reflected by the polarization surface of the composite prism 34 and then reflected by the reflective mirror 38 after being converted into infinite light by the collimating lens 36. Moreover, a part of the laser beam passes through the reflective mirror 38 to be radiated on the FMD 23. Thus, the output of the laser device 24 is controlled on the basis of the output of the FMD 23.

The laser beam reflected by the reflection mirror 38 is totally reflected by the reflection mirror 40 and then converted from the beam linearly-polarized in the S direction into a circularly-polarized beam after passing through the quarter-wavelength plate 42. Thereafter, the laser beam as the circularly-polarized beam is reflected by the reflecting mirror 44 and then focused on an information recording layer of the optical disc 52 by the objective lens 10.

Next, the laser beam (returning beam) reflected by the information recording layer of the optical disc 52 passes through the objective lens 10 and are converted from the circularly-polarized beam into the laser beam as the beam linearly-polarized in the P direction by passing through the quarter-wavelength plate 42 after being reflected by the reflecting mirror 44. Then, the laser beam passes through the collimating lens 36, and the composite prisms 34 and 28 after being reflected by the reflective mirrors 40 and 38. Thereafter, astigmatism for focus error detection is given to the laser beam by the anamorphic lens 54. The laser beam is then received by the light receiving region of the PDIC 56 and then converted into a detection signal by photoelectric conversion.

Next, a description will be given of optical paths of the laser beam of the BD standard.

First, the laser beam emitted from the laser device 22 is made incident on the composite prism 28 after being converted into the beam circularly-polarized in the S direction by the diffraction grating 26. Thereafter, the laser beam is totally reflected by the polarization surface of the composite prism 28 and then totally passes through the composite prism 34. Thereafter, the laser beam is converted into infinite light by the collimating lens 36, and then, a large portion of the laser beam is reflected by the reflection mirror 38, and the remaining portion thereof passes through the reflective mirror 38. The laser beam that has passed through the reflective mirror 38 is detected by the FMD 23. Thus, the output of the laser device 22 is adjusted on the basis of the output of the FMD 23 in the same manner described above.

The laser beam reflected by the reflective mirror 38 is totally reflected by the reflective mirror 40 and then converted from the beam linearly-polarized in the S direction into the circularly-polarized beam after passing through the quarter-wavelength plate 42. Thereafter, the laser beam as the circularly-polarized light is reflected by the reflecting mirror 44 and then focused on the information recording layer of the optical disc 52 by the objective lens 10.

Next, the laser beam (returning light) reflected by the information recording layer of the optical disc 52 passes through the objective lens 10 and is converted from the circularly-polarized beam into the laser beam as the beam linearly-polarized in the P direction by passing through the quarter-wavelength plate 42 after being reflected by the reflecting mirror 44. Then, the laser beam passes through the collimating lens 36, the composite prisms 34 and 28 after being reflected by the reflective mirrors 40 and 38. Thereafter, astigmatism is given to the laser beam by the anamorphic lens 54. The laser beam is then received by the light receiving region of the PDIC 56. Then, a detection signal formed by photoelectric conversion is outputted.

The optical paths of the laser beams of the embodiment have been described above.

Here, it is also possible to perform LightScribe by using the objective lens and the optical pickup described above. LightScribe is a technique to write character information or picture information on a surface opposite to the recording surface of an optical disc by laser etching. Since the objective lens of this embodiment has a high use efficiency of the laser beam, LightScribe can be performed efficiently.

In the embodiment, a center region for focusing a first laser beam, a second laser beam and a third laser beam is provided near a center portion of an objective lens. Then, an annular zone step having a height calculated on the basis of a wavelength of the first laser beam is provided in order to correct spherical aberration of the second laser beam. Moreover, the surface of this region is formed into such a shape that aberration occurs with both of the first laser beam and the second laser beam. With this configuration, although slight aberration occurs with the first laser beam, aberration of the second laser beam is further reduced. Thus, occurrence of aberration is improved as a whole.

In addition, the laser beams are focused on information recording layers of optical discs by refraction effect rather than diffraction effect in this embodiment. Thus, a loss in the light amount is reduced, and reading accuracy is thus improved.

What is claimed is:

1. An objective lens configured to focus a first laser beam having a first wavelength on an information recording layer of a first optical disc, to focus a second laser beam having a second wavelength longer than the first wavelength on an information recording layer of a second optical disc having a coating layer thicker than that of the first optical disc, and to focus a third laser beam having a wavelength longer than the first and second wavelengths on an information recording layer of a third optical disc having a coating layer thicker than those of the first and second optical discs, the objective lens comprising a center region provided at and around a center portion of the objective lens, and configured to focus the first laser beam, the second laser beam and the third laser beam respectively on the information recording layers of the first optical disc, the second optical disc and the third optical disc, wherein the center region is set to have a surface shape including an annular zone step having a step amount calculated on the basis of only one wavelength, the first wavelength of the first laser beam being the only one wavelength, and the surface shape causing aberrations of both of the first laser beam and the second laser beam.

2. The objective lens according to claim 1, wherein the step amount of the annular zone step is calculated with respect to the center of a lens surface where the annular zone step is provided.

3. The objective lens according to claim 1, wherein a majority portion of aberration of the first laser beam caused by the center region is on any one of positive and negative sides, a majority portion of aberration of the second laser beam caused by the center region is on the other one of the positive and negative sides, and the positive side corresponds to a traveling direction of the laser beams incident on the objective lens, and the negative side corresponds to a traveling direction of the laser beams returning from the objective lens.

4. The objective lens according to claim 1, wherein the aberration of the first laser beam is shifted at a position where the annular zone step is provided.

5. The objective lens according to claim 1, wherein the first laser beam is a laser beam of a BD standard, the second laser beam is a laser beam of a DVD standard, and the third laser beam is a laser beam of a CD standard, and the step amount of the annular zone step is calculated using a wavelength of the laser beam of the BD standard.

6. The objective lens according to claim 5, wherein the wavelength used in calculation of the step amount of the annular zone step is within a range of 395 nm to 420 nm.

7. The objective lens according to claim 1, wherein the first laser beam, the second laser beam, and the third laser beam are infinite light or weak finite light.

8. The objective lens according to claim 1, further comprising:

an annular zone-shaped intermediate region provided at a position surrounding the center region and configured to focus plural ones of the first laser beam, the second laser beam and the third laser beam on the information recording layers of the corresponding optical discs and an annular zone-shaped outer circumferential region provided at a position surrounding the intermediate region and configured to focus the first laser beam or the second laser beam on the information recording layer of the corresponding optical disc.

9. The objective lens according to claim 8, wherein the intermediate region includes in this order from an inner side to an outer side:

a first intermediate region configured to respectively focus the second laser beam and the third laser beam on the information recording layers of the corresponding optical discs; and a second intermediate region configured to respectively focus the first laser beam and the second laser beam on the information recording layers of the corresponding optical discs.

10. The objective lens according to claim 8, wherein the outer circumferential region includes in this order from an inner side to an outer side:

a first outer circumferential region configured to focus the first laser beam on the information recording layer of the first optical disc;

a second outer circumferential region configured to focus the second laser beam on the information recording layer of the second optical disc; and a third outer circumferential region configured to focus the first laser beam on the information recording layer of the first optical disc.

11. The objective lens according to claim 1, wherein the step amount is calculated using the following equation:

$$D=m\cdot\lambda(n-1)$$

wherein m is an integer not less than 1, n is a refractive index of the objective lens, and $\lambda$ is the first wavelength of the first laser beam.

12. An optical pickup apparatus comprising the objective lens according to claim 1.

13. The optical pickup apparatus according to claim 12 further comprising a collimating lens configured to convert the laser beams to be incident on the objective lens into infinite light or weak finite light.

* * * * *